United States Patent [19]

Choi

[11] Patent Number: 5,121,200
[45] Date of Patent: Jun. 9, 1992

[54] TRAVELLING MONITORING SYSTEM FOR MOTOR VEHICLES

[76] Inventor: Seung-Lyul Choi, 226-301, Kwonsun Jugong Apt., Kwonsun-gu, Suweon-city, Kyungki-do, Rep. of Korea

[21] Appl. No.: 549,092

[22] Filed: Jul. 6, 1990

[51] Int. Cl.⁵ .............................................. H04N 7/18
[52] U.S. Cl. .................................. 358/103; 358/108; 354/81
[58] Field of Search ............... 358/103, 105, 108, 229; 850/603, 604, 605, 606, 637; 248/549, 900; 354/81, 293

[56] References Cited

U.S. PATENT DOCUMENTS

| | | |
|---|---|---|
| 3,689,695 | 9/1972 | Rosenfield et al. |
| 3,882,268 | 5/1975 | Ogawa et al. |
| 4,420,238 | 12/1983 | Felix ............................ 358/229 |
| 4,630,109 | 12/1986 | Barton ......................... 358/103 |
| 4,672,435 | 6/1987 | Gluck. |
| 4,716,458 | 12/1987 | Heitzman et al. ............ 358/103 |
| 4,910,591 | 3/1990 | Petrossian et al. .......... 358/103 |
| 4,911,545 | 3/1990 | Miller ......................... 350/604 |
| 5,027,104 | 6/1991 | Reid ........................... 358/108 |
| 5,027,200 | 6/1991 | Petrossian et al. .......... 358/103 |

FOREIGN PATENT DOCUMENTS

| | | | |
|---|---|---|---|
| 3317003 | 11/1984 | Fed. Rep. of Germany | 358/108 |
| 60-259543 | 12/1985 | Japan | 358/108 |
| 1-47637 | 2/1989 | Japan | 350/606 |

*Primary Examiner*—James J. Groody
*Assistant Examiner*—Kim Yen Vu
*Attorney, Agent, or Firm*—Ostrolenk, Faber, Gerb & Soffen

[57] ABSTRACT

A travelling monitoring system for motor vehicles on which a monitoring camera is mounted is disclosed herein. The system includes a monitoring part, a display part, and a part for protruding and hiding the camera. The camera is designed to be protected from the bad weather of snow or rain and the possibility of the burglary by the adaptation of the part for protruding and hiding therefor. The system also includes an auxiliary rear-view mirror part provided against the extraordinary condition.

20 Claims, 5 Drawing Sheets

FIG. 3
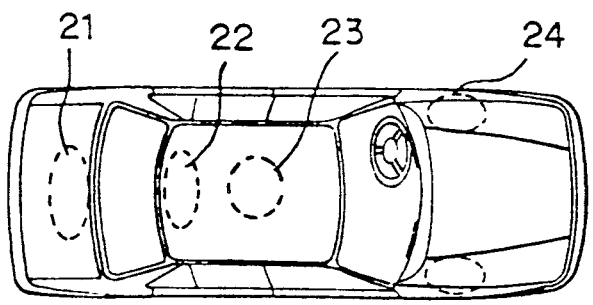
FIG. 4
FIG. 4(a)
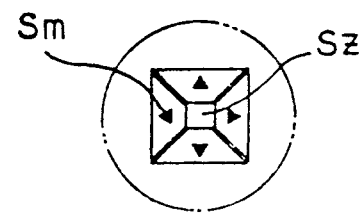
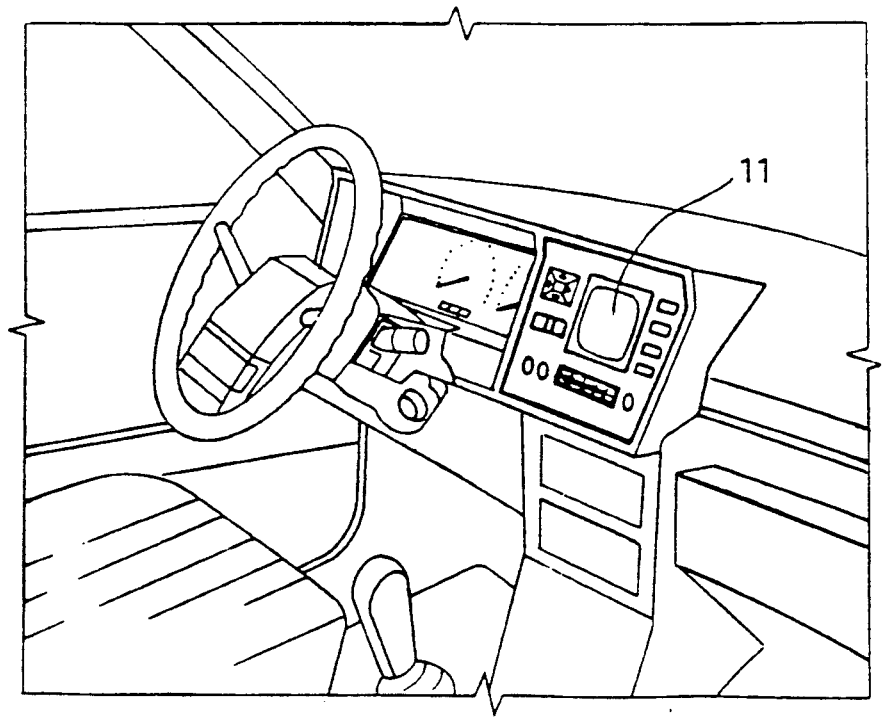

TRAVELLING MONITORING SYSTEM FOR MOTOR VEHICLES

BACKGROUND OF THE INVENTION

This invention relates to a travelling monitoring system for motor vehicles on which a camera is mounted in order to display an image of the objects which exist in the lateral or rear side of the vehicle on a monitor in the interior of the vehicle during the travelling thereof, more particularly, the system for displaying the travelling information of the vehicle through the retractable monitoring camera which is mounted thereon in such a manner that it may be hiden into or protruded from the vehicle.

In the progressive systems for motor vehicles in the prior art, there have been a motor vehicle-carrying monitoring system which enables the driver to operate for travelling the vehicle without one's depending on the rear-view mirror by monitoring the objects which exist in the lateral or rear side of the vehicle through the monitoring camera mounted thereon as disclosed in a Japanese Open-Laid Publication No. 61-602960 and an motor vehicle-carrying television receiver which is intended to represent a distance relationship with a picture image to be registered by rear monitoring camera on the monitor during one's backing the vehicle up as disclosed in a Japanese Open-Laid Publication No. 60-79889.

These prior arts have replaced the rear-view mirror as monitoring means, which drivers commonly depend on, by a monitoring camera and monitor system, and have enabled to obtain the various travelling information of the vehicle by recording the information onto a recording media through VTR or the like.

In such systems like these prior arts, the monitoring camera may be mounted either on the vehicle body in a projection manner or on the rear side of the vehicle in such a manner like a real upper brake lamp. In the above described cases, there still remains dificulties to protect the camera from the bad weather of snow or rain. While on the occasion which the camera is mounted indoor, there may be involved the dead angle zones due to the narrowing of the view angle resulting in the difficulties of the rearward monitoring.

In addition, when the camera is mounted on the outer of the vehicle, the external appearance is not graceful so as to go against the tendency to high-fashionization in the motor vehicle design as well as the possibility of the burglary of high priced camera become a matter of great anxiety.

Thus, it has been greatly recognized a need to protect the camera from the bad weather of snow or rain and the anger of the burglary, and more required the technology therefor.

SUMMARY OF THE INVENTION

An object of this invention is to provide a monitoring camera hiding and protruding apparatus, by which the camera can be protruded from the interior of the vehicle body during the vehicle is travelling and the camera can be hiden into the interior of the vehicle body when the vehicle is not driven for preventing the camera from the snowy or rainy weather and the burglary and for promoting the high fashionization of the vehicle.

Another object of the invention is to provide a motor vehicle travelling monitoring system which the camera is rotatable, if needed, during travelling and the objects can be displayed on the monitor with the objects magnified, and which can prevent the chattering of the focus due to the conditions of a road surface so as to increase the stability of the display, and which the vehicle can be travelled with a rear-view mirror.

Still another object of the invention is to provide the system for emergency replacing the system with an auxiliary rear-view mirror when the trouble is occurred on the side of the monitoring camera and monitor by protruding the mirror from the hiding state.

According to the present invention, there is provided a system for monitoring a travelling of the motor vehicles having a monitor and a monitoring camera for displaying a travelling information of a picture image taken in the lateral, the rear and the other side of the vehicle on the monitor, the system comprises: a monitoring means for monitoring the front, the rear, the right and the left side of a vehicle in a travelling direction by a camera which is movable upward and downward and is rotatable; a display means for displaying a travelling information according to the camera on the monitor; and a protruding and hiding means being operated at the same time of starting of the vehicle for protruding automatically the camera outward the vehicle body and for hiding the camera inward the vehicle body when stops operating.

There is further provided a system for monitoring the travelling of the motor vehicles which includes an auxiliary means for protruding and hiding an auxiliary rear-view mirror from and into a retaining recess respectively by selective using an automatic and a manual functions.

Additionally, there is also provided a system for monitoring the travelling of the motor vehicles which includes a recording and reproducing means for recording and reproducing a travelling information taken by the camera.

BRIEF DESCRIPTION OF THE DRAWINGS

These and other objects, features, and advantages of the present invention will become more apparent from the following description for the preferred embodiments taken in conjunction with the accompanying drawings, in which:

The embodiment of the invention will now be discussed in connection with the accompany drawings in which:

FIG. 3 is a plan view of the vehicle showing the mounting portion of the monitoring camera;

FIGS. 4 AND 4(a) are view of one embodiment of the arrangement of the monitor and VTR within the interior of the vehicle;

DESCRIPTION OF PREFERRED EMBODIMENTS

Figure 1:
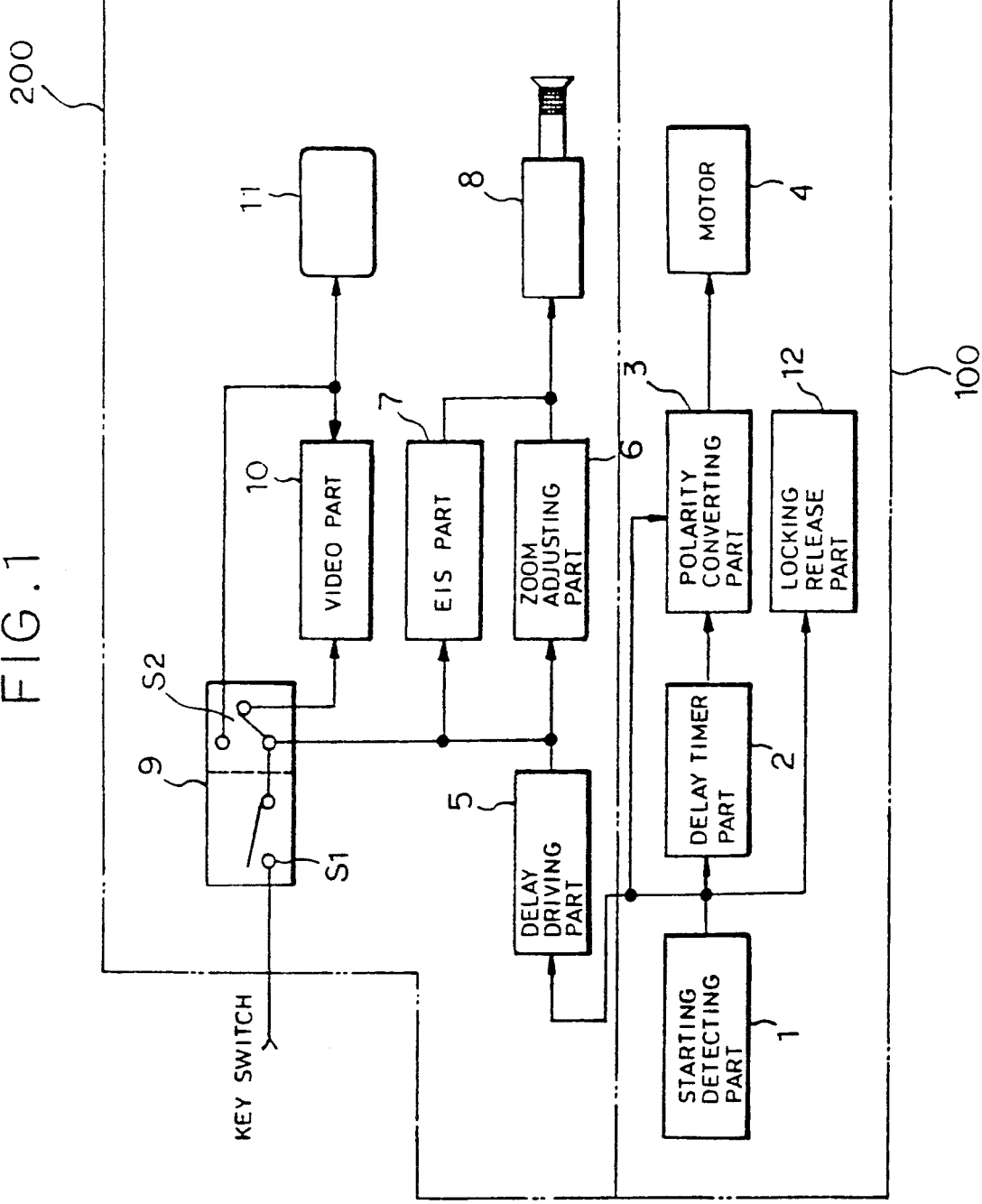
FIG. 1 shows a block diagram of the driving circuit for the vehicle travelling monitoring system according to the invention.

Referring now in detail to the drawings. FIG. 1 illustrates a block diagram of the driving circuit of this invention.

In the drawing, reference numeral 100 is a protruding and hiding circuit part of the driving circuit for protruding and hiding the camera, wherein 1 is a starting detecting part for detecting the starting of motor engine when starting, 2 is a delay timer part which is detecting the output of the starting detecting part at every rising edge and fall edge thereof, and is then on and off after delaying for a predetermined time interval, and 3 is a polarity converting part which applies the driving electric power source to the driving motor 4 when the output of the delay timer part 2 is in logic "1" and which converts the polarity of the electric power source applied to the motor 4 when the starting detecting part 1 is in logic "0".

The driving motor 4 is a conventional DC motor, and is a power source for protruding and hiding the camera, 12 is a locking release part for releasing the locking of a rid member, on which the camera is mounted, at the time when the vehicle is starting.

200 is a monitoring and indicating circuit for operating the camera and a monitor and VTR, wherein 5 is a delay driving part which receives the output of the starting detecting part 1 and then drive a video camera, as a monitoring camera, and a monitor 11 after delaying the output for a predetermined time interval, 6 is a zoom adjusting part for adjusting the zoom of the camera 8, thereby adjusting the far and wear of the objectives which is displayed on the monitor.

7 is an Electronic Image Stabilization EIS part which prevents the chattering of focus to stably take pictures of the objectives regardless of the conditions of a road surface, 9 is a switching part which has a switch S2 for selecting a mode for the camera or a mode for watching the video and general TV program, and a switch S1 for selecting a monitor 11 or video part 10 at the first stage turn-on of the key switch of the vehicle, and functions to connect the camera 8 and its related control circuits to the electrical power source when the automatic or manual use of the camera 8 is required.

10 is a conventional video part for recording the picture image taken by the camera or reproducing the information to be already recorded, the monitor 11 has a general TV circuit.

Figure 2:
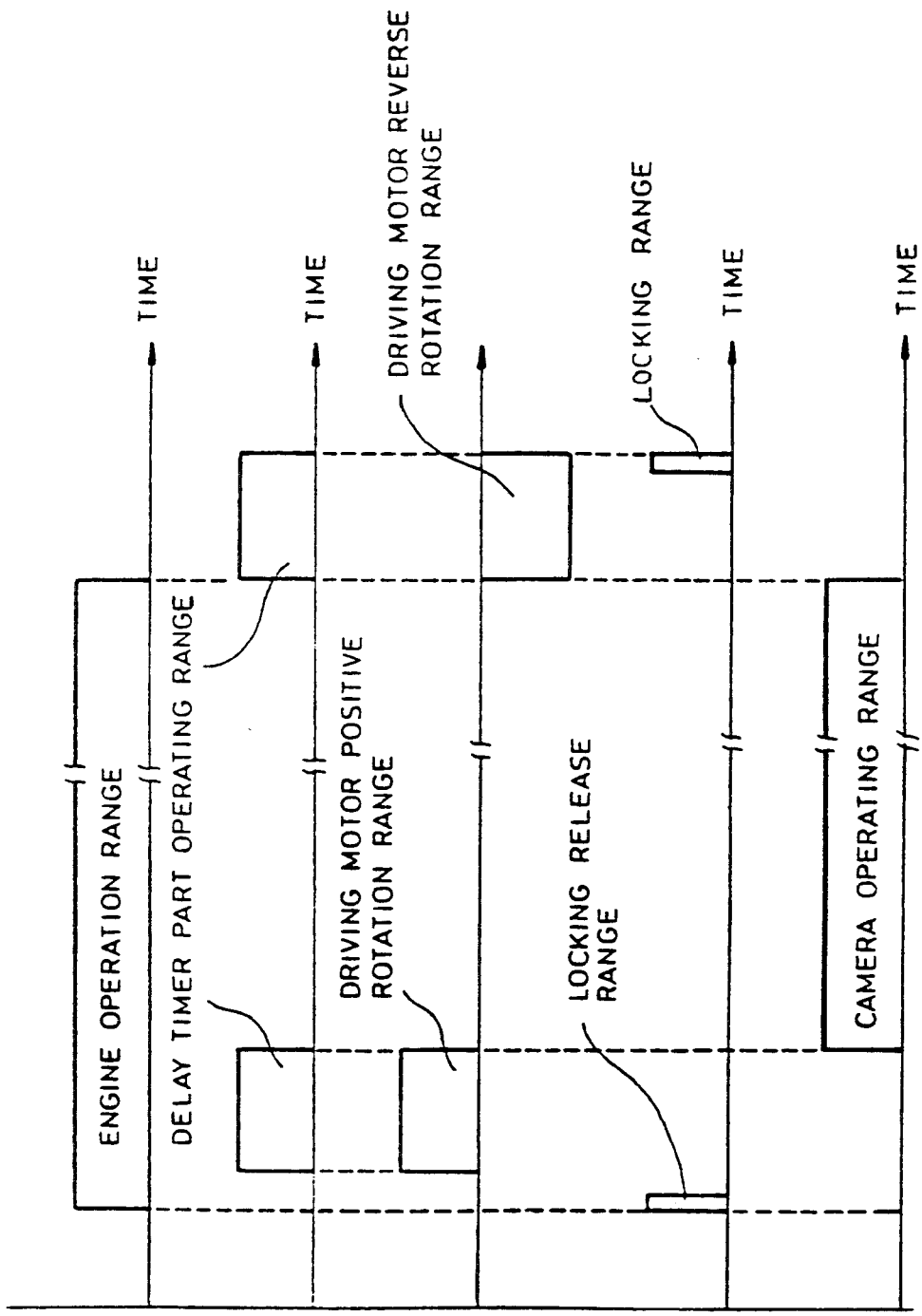
FIG. 2 is a timing chart showing an operational relationship of the parts of the FIG. 1.

FIG. 2 shows the wave Chart which represents the operational relationships of the above described parts. As illustrated, when the engine of the vehicle is operated, a time setting delay timer part 2 is operated to be off after a predetermined time interval is lapsed.

At the same time when the delay timer part 2 is operated, a locking release part 12 is operated to release the locking of the rid member.

In the polarity converting part 3, the rotational direction of the driving motor 4 is determined by applying the power supply of the driving motor 4 as positive when the outputs of the starting detecting part 1 and the delay timer part 2 are identically in logic "1" and by applying the power supply of the driving motor 4 as negative when the output of the starting detecting part 1 is in logic "0".

And, by setting the delay time interval of the delay driving part 5 is relatively longer than that of the delay timer part 2, the camera and monitor 11 is to be operated when the delay timer part 2 is in off.

FIG. 3 illustrates one embodiment of provision of the camera 8 within the vehicle.

The camera 8 may be selectively provided at the rear deck portion 21, the turret top portion 22, the top plate portion 23, or the engine bonnet's side portion 24 of the vehicle and it is preferably to set more than at least one camera 8.

FIG. 4 illustrates the embodiment of the provision of monitor 11 and various operation switches on the dash board pannel of the driver's seat.

The various operation include switches S1, S2 of the Switching part 9, a function switch for monitor 11 of the video part 10, a operation switch for position movement of the camera 8, and a zoom switch S2.

Figure 5:
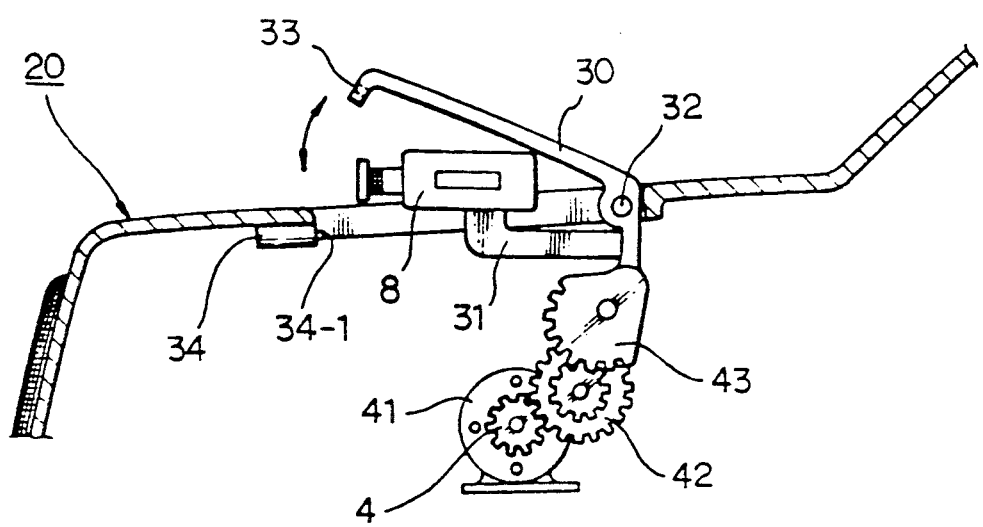
FIG. 5 is a schematic drawing of one embodiment of the hiding device in accordance with the present invention.

FIG. 5 illustrates the hiding structure for the camera, the hiding structure has a power transmitting mechanism comprising a driving DC motor 4, an idle gear 42 engaged with a chaft gear 41 of the driving motor 4, and a sector gear 43 engaged with tthe other side of the idle gear 42. The one side of the sector gear 43 is fixedly attached to the one side of the rid member 30, the camera 8 is arranged to fix by support 31 within the inside of the rid member 30.

Furthermore, the outer shape of the rid member 30 is preferably to be shaped as a curved surface which is identical with a outer surface of the vehicle 20, when the rid member 30 is closed for hiding the camera and which may reduce the air resistance as possible when the rid member 30 is opened for protruding the camera.

And, a pivot shaft 32 is provided at the one side of the rid member 30, an inserting hole 33 for locking is formed at the other side of the window.

The locking part 8 is provided at the corresponding position of the hole 33 when the camera 8 is hiden.

As shown in the figure, the solenoid 34 or the like is provided in the locking part 8, and a movable member 34-1 of the solenoid 34 is inserted into the hole 33 when the camera is hiden, thereby preventing the camera 30 from opening in case of the application of the artificial or foreign impact to that portion.

The locking means are not limited into such an electromagnetic structure and it may be a mechanical structure for locking and releasing the rid member in an automatic or manual manner and may be includes conventional means.

With such an arrangement of the invention, when the user initiates the starting of the engine, the ignition system, which is typically comprised with an ignition switch, an ignition coil, a distributor and ignition plugs, is operated to start the engine. If the engine initiate to start, the starting detecting part 1 detects the state of the engine starting and then generates the detecting output.

After a predetermined time interval (a few seconds), the delay timer part 2 generates the delayed output as logic "1". This output is applied to the driving motor 4 through the polarity converting part 3 and then the motor 4 is driven.

At this time, as the output of the detecting part 1 is in logic "1" in the polarity converting part 3, positive power supply is applied to the motor 4.

In addition, at the same time of the engine starting, the locking release portion 8 is also operated, and in one embodiment the solenoid 34 of the portion 8 is operated and then the movable member 34-1 comes out from the hole 33 of the rid member 30 so that the locking is released.

Thus, the driving motor 4 is driven, the power of the motor 4 is reducedly transmitted to the sector gear 43 via the idle gear 42 which is tooth-engaged with the shaft gear 41.

As the rid member 30 is integrally attached to the section gear 43 and rotates about the pivot shaft 32, thereby opening toward the outside of the body 120.

If the rid member 30 is opened at a predetermined angle, the output of the delay timer part 2 is then in logic "0" according to the lapse of the time interval so that the driving of the motor 4 is stopped, wherein the driving time of the delay timer part 2 is set to be identical with the desired time which the member 30 is perfectly open.

On the other hand, the delay driving part 5 generates the output at the time point when the delay timer part 2 is in off by completing the rid member's opening. The output of the part 5 operates the camera 8 through the 200 m adjusting part 6 and the EIS part 7, while the output operates the video part 10 and monitor 11 through the switching part 9. And particularly the monitor 11 is directly operated when the video part 10 is in off. Consequently the required picture image taken by the camera is to be displayed on the monitor 11.

Like such a manner, according to the opening of the rid member 30, the camera which is hiden within the inside of th vehicle is disclosed to the outside of the body, so that the required picture image travelling is can be displayed on the monitor 7.

The camera 8 takes to display the image information on the monitor in front, rear, and lateral sides according to each location of the camera, as illustrated in FIG. 3.

Figure 6:
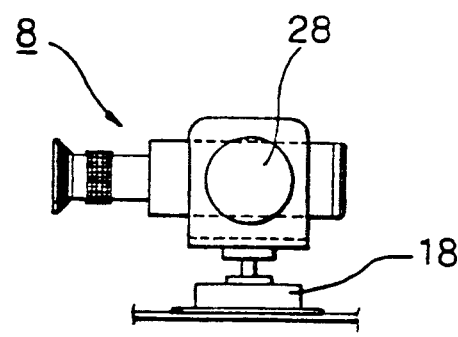
FIG. 6 is a side view showing the up-down moving and rotating device for the camera.

FIG. 6 shows the camera operating construction for its up-down movement and right-left rotation.

This construction includes a motor 18 for right-left rotator of the camera 8 at the lower portion of the camera body, and a motor 28 for up-down movement of the camera for varying the view find angle at the one side portion of the camera body.

The operation switches Sm of the motors 18 and 28 are provided together with the various operation switches of FIG. 4 so that the operation is able to control the picture image taking direction and angle of the camera 8 at every required time.

The operator can use the zoom function of the camera through the zoom adjusting part 6, the zoom switch Sz of the part 6 is also provided together with said switches.

When the conditions of a road surface is not so smooth for travelling, as the focus is not so disadvantageously stable as to take the objectives, teh image displayed on the monitor 8 is very chattered so as to hardly recognize the other travelling vehicles.

In order to prevent this disadvantage, EIS part 7 is provided with this system for preventing the chattering of the focus, and for displaying the stable image.

Thus, the system according to this invention is not restricted to the condition of the road surface.

The travelling information taken by the camera 8 and displayed on the monitor 11 may be recorded on the video part 10 by the selection of the switching part 9, and also reproduced by demand.

This art is well-known and the detailed description thereof is deleted herein.

On the other hand, when the standstill of the vehicle travelling, that is, the engine of the vehicle is in off, the output of the starting detecting part 1 is to be became logic "1" by falling edge of the part 1 and then now become logic "0" after the timing setting time is lapsed.

For this timing setting time, as the output of the starting detecting part 1 is in logic "0" at the polarity converting part 3, the polarity of the electric power to be applied to the driving motor 4 is converted and applied as an reversed polarity to motor 4, and then the motor 4 is to be rotated in the reverse direction.

Accordingly, the motor 4 is rotated in the reverse direction, the idle gear 42 and sector gear 43 are driven in the reverse direction which is reversed at the time of starting, thereby closing the rid member 30.

At this time, the rotation of the driving motor 4 is stopped, wherein the required time for closing the member 30 is set to be identical with the timing time of delay timer part 2.

On the other hand, when the functional jam of the rid member 30 is occured due to the trouble of the circuit 100 of FIG. 1, the opening operation of the member 30 is manually achieved by disconnecting the mating relationship between the sector gear 43 and the idle gear 42.

On this manual operation, the power supply to the monitoring and indicating circuit 200 is achieved by turning on the switch S1 of the switching part 9 for direct-supplying from the keyswitch of the vehicle.

In addition, if the end of the movable member 34-1 of the solenoid 34 may be formed as a beveled shape on the upper side thereof, the rid member can be locked in such a manner that the movable member 34-1 is pushed by the force for closing the member 30 and then immediately inserted into the hole 33.

Figure 7:
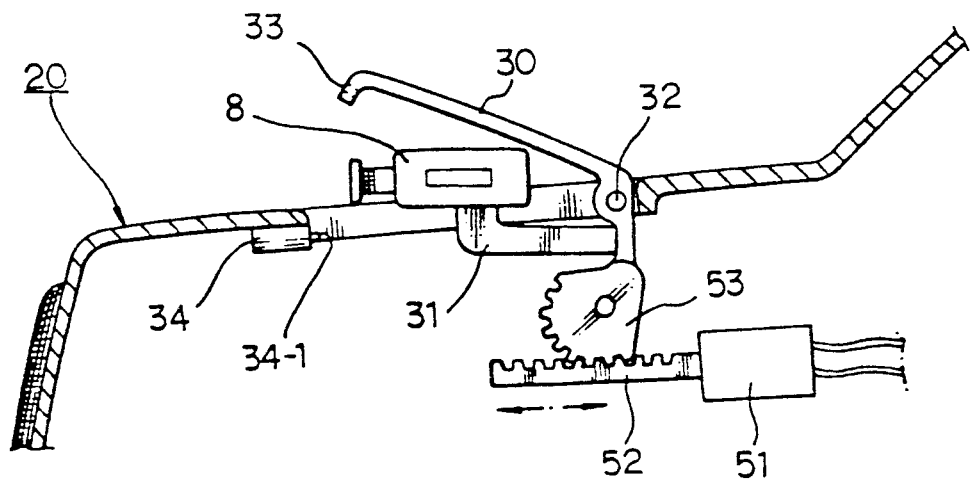
FIG. 7 is a schematic drawing of another embodiment of FIG. 5.

FIG. 7 illustrates another embodiment of the operation structure of the member 30 shown in FIG. 5.

This structure comprises a hydraulic cylinder 51, a movable rack member 52 which is rectilivearly driven by the hydraulic cylinder 51, and a driving gear 53 which is tooth-engaged with the member 52, the driving gear 53 being fixed at one side of the rid member 30, and the member 30 being opened and closed in a rotational manner by the driving of the cyclinder 51.

Figure 8A:
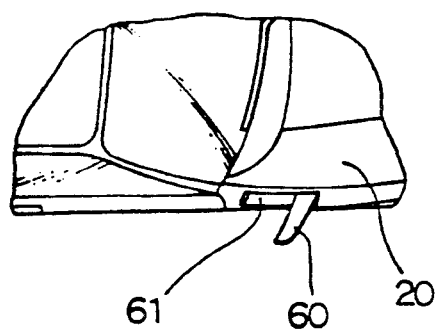
FIG. 8a and b are each showing a cross-sectional view of the mounting structure for the auxilliary rear-view mirror in accordance with the invention.
Figure 8B:
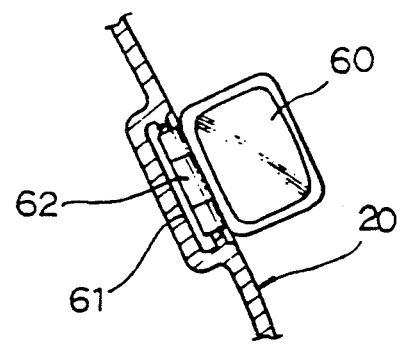

FIG. 8a and 8b illustrate a plan view of the essential part of the auxiliary rear-view mirror according to the invention and a cross-sectional view thereof respectively.

This auxiliary mirror is for the extraordinary usage, e.g. when the travelling information may not be displayed by the occurrence of the troubles on the camera 8 and monitor 11 and so on, or when the system according to the invention could not be operated ordinarily.

That is, this auxiliary mirror may be functioned like a conventional mirror by protruding it.

For this purpose, at the corresponding position of the vehicle body is formed a retaining recess for retaining the mirror, and at one side the mirror is attached to the body in a hinged relationship therewith by the shaft 52.

Further, the mirror is retained into the recess with the mirror retracted under the ordinary condition, but the mirror is protrudible from the body in a manual manner under the extraordinary condition.

Though the operation of the mirror 60 is achieved by a manual manner, it can be easily seen that the operation is conveniently performed by its automation, for example, by the adaptation of the electromagnetic operating mechanism for its precise rotation in angle, the operation switch of which is then provided within a driver's operational area.

According to the invention discussed and described in the above, it is certainly known that the travelling safety can be highly enhanced only through monitoring the monitor which is accommodatedly provided at an available location to the driver and displays the information of the objectives in the observation direction, because the rid member 30 is automatically opened for image-taking of the camera 8 when the vehicle is starting, and there is no need to move the driver's line of sight in up and down, right and left direction.

And also this invention is to eliminate the dangerous elements such like a dead angle zones which commonly exist when the drive depend his observation in lateral and rear sides near the vehicle only upon the typical rear-view mirror, so that the peculiar effect of the present invention is more enhanced.

In addition, according to the invention, whenever the shaking of the camera is occurred by the roughness of a road surface, the stabilized travelling information can be displayed on the monitor because of the adaptation of the EIS circuit into the system, and drivers can obtain the various travelling information by controlling the direction, the angle and the far and near of the image-taking through manipulating the operation switch Sm for the motors 18, 28 and the zoom switch Sz, and by magnifying the information about the important objectives which is displayed on the monitor.

And it is certain that this invention promotes the everyday car life and gives relaxation to the driver by providing with the opportunity to watch the TV through the selection of the VTR or TV channels during the waiting turn for the traffice signals or while stopping.

According to the invention as described in the above, the monitoring camera is concealably provided within the interior of the vehicle body and can be also disclosed from the body only when travelling, so that the camera is prevented from a malfunction or life-shortage thereof due to the snowy and rainy weather, and the burglary of other persons, and enables the outer shape of the vehicle to be graceful.

Furthermore, in order to promote the safety of the travelling, the auxiliary mirror, as a part of the invention, is also provided within the vehicle body, the mirror of which can be retracted into the recess under ordinary condition, and protruded from the vehicle body for the above described extraordinary use.

The invention is in no way limited to the embodiment described hereinabove. Various modifications of disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. A traveling monitoring system for motor vehicles, comprising:
    a monitoring means for monitoring travelling information in the front, the rear, the right and the left side of a vehicle by a camera which is movable upward and downward and is rotatable;
    a display means for displaying said travelling information on a monitor inside said vehicle;
    a protruding and hiding means for automatically protruding the camera outside the vehicle body upon starting of the vehicle and for hiding the camera inside the vehicle body when the vehicle stops operating;
    a starting detecting part for detecting the starting of the vehicle;
    a delay timer part which operates after a delay following the rising edge of the output of said starting detecting part and upon the falling edge of the output of said start detecting part and which turns off after a predetermined time;
    a polarity converting part for selectively providing positive or negative electric power to a driving a motor in accordance with the outputs of the delay timer part and the starting detecting part; and
    a locking release part for releasing the locking of a rid member, the locking release part being simultaneously operated at the time of operating of the starting detecting part.

2. A system according to claim 1, wherein the monitoring means includes:
    a delay driving part being driven at the time of completing the operation of the delay timer part,
    a camera being operated by the output of the delay driving part,
    a zoom adjusting part for magnifying an image information of the camera,
    an EIS part for preventing a focus of the camera from chattering regardless of the conditions of a road surface;
    a switching part for selecting an output of the delay driving part and an electric power source of a key switch;
    a video part for recording and reproducing a travelling information by the camera; and
    a monitor having a conventional TV circuit and displaying a travelling information by the camera.

3. A system according to claim 2, wherein the protruding and hiding means is characterized in that a movable rack member of a hydraulic cylinder is engaged with the sector gear to which one side of said rid member is fixedly attached.

4. A system according to claim 2, wherein said monitoring means includes an auxiliary mirror, said auxiliary mirror being protruded and retracted in accordance with the operation of said camera.

5. A system according to claim 4, wherein said auxiliary mirror is adapted to be also operable manually.

6. A system according to claim 1, wherein the protruding and hiding means has such an operational construction that a shaft gear of the driving motor is engaged with an idle gear, a sector gear is engaged with one side of the idle gear, the rid member is fixedly attached to the sector gear on which the camera is installed.

7. A system according to claim 1, wherein the protruding and hiding means is characterized in that a movable rack member of a hdyraulic cylinder is engaged with the sector gear to which one side of said rid member is fixedly attached.

8. A system according to claim 1, wherein the protruding and hiding means has an electromagnetic locking device with a solenoid.

9. A system according to claim 1, wherein the protruding and hiding means has a mechanically operated locking device.

10. A system according to claim 1, wherein the monitoring means has a zoom function for taking a desired image to be displayed in magnification.

11. A system according to claim 1, wherein the camera is provided with one motor for rotational movement at the bottom surface thereof and the other motor for up-down movement at one side thereof.

12. A system according to claim 1, wherein the monitoring means has an EIS part for excluding a restriction due to the conditions of a road surface.

13. A traveling monitoring system for motor vehicles having a monitor and a monitoring camera for displaying travelling information in the form of a picture image taken in the lateral, the rear and the other side of the vehicle on the monitor, comprising;
- a monitoring means comprising a camera for monitoring traveling information, the camera being changeable in direction during operation;
- a detecting means for detecting a start signal and a stop signal generated upon the starting and stopping of the vehicle;
- a delaying means for delaying the operation of said monitoring means for predetermined time following the detection of said start signal and said stop signal by said detecing means;
- a protruding means operable in response to said start signal for protruding said monitoring means; and
- a hiding means operable in response to said stop signal for retracting said monitoring means.

14. A system according to claim 13, including at least one display means for displaying said traveling information monitored by the camera of said monitoring means.

15. A system according to claim 14, wherein said display means is adapted to receive and display video signals from sources other than said monitoring means.

16. A system according to claim 13, wherein said monitoring means is automatically retracted in the event of an accident of the vehicle.

17. A system according to claim 13, wherein said monitoring means includes an auxiliary mirror, said auxiliary mirror being protruded and retracted in accordance with the operation of said camera.

18. A system according to claim 17, wherein said auxiliary mirror member is adapted to be also operable manually.

19. A travelling monitoring system for motor vehicles having a monitor and a monitoring camera for displaying travelling information in the form of a picture image taken in the lateral, the rear and the other side of the vehicle on the monitor, comprising;
- a monitoring means comprising a camera for monitoring travelling informatin, the camera being changeable in direction during operation;
- a detecting means for detecting a start signal and a stop signal generated upon the starting and stopping of the vehicle;
- a delaying means for delaying the operation of said monitoring means for a predetermined time following the detection of said start signal and said stop signal by said detecting means;
- a protruding means opearable in response to said start signal for protruding said monitoring means; and
- a hiding means operable in response to said stop signal for retracting said monitoring means;
- wherein said monitoring means includes an auxiliary mirror, said auxiliary mirror being protruded and retracted in accordance with the operation of said camera.

20. A system according to claim 19, wherein said auxiliary mirror is adapted to be also operable manually.

* * * * *